United States Patent Office 3,755,400
Patented Aug. 28, 1973

3,755,400
SYNTHESIS OF CYCLIC ALUMINUM
COMPOUNDS
Lawrence H. Shepherd, Jr., Baton Rouge, La., assignor to
Ethyl Corporation, Richmond, Va.
No Drawing. Filed Dec. 13, 1971, Ser. No. 207,517
Int. Cl. C07f 5/06
U.S. Cl. 260—448 A                14 Claims

ABSTRACT OF THE DISCLOSURE

Nonionic organoaluminum compounds possessing an aluminacyclopentene moiety are formed by mixing (a) alkali metal 1,1-dihydrocarbylaluminacyclopent-3-enide with (b) aluminum trihydrocarbyl or dihydrocarbyl aluminum hydride in proportions corresponding to at least about 1.3 moles of (b) per mole of (a) in the presence of a suitable Lewis base.

This invention relates to the synthesis of cyclic organoaluminum compounds, more particularly, compounds in which an aluminum atom is part of an olefinically unsaturated ring system.

BACKGROUND

Lehmkuhl, Angew. Chem. International Edition 5, 663 (1966), indicates that reaction of butadiene with alkali metal in an ether in the presence of an amount of trimethylaluminum-ether adduct equivalent to the metal causes the formation of the complex:

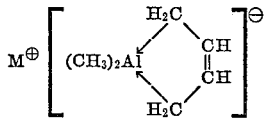

where M is lithium or sodium. This adduct is insoluble in aliphatic hydrocarbons and benzene. It decomposes above 150° C. without melting.

In copending application Ser. No. 771,651, filed Oct. 29, 1968, now U.S. 3,631,065, it is shown that nonionic organoaluminum compounds possessing an aluminacycloalkene moiety are produced by causing interaction among aluminum, a conjugated diene and a hydrocarbon aluminum hydride in the presence of a Lewis base capable of complexing with the nonionic organoaluminum compound without undergoing excessive cleavage. For example, when the diene reactant is butadiene or butadiene substituted in the two position or in the two and three positions, the principal product produced is characterized by the formula:

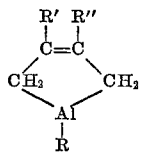

wherein R is a hydrocarbon group having up to about 18 carbon atoms; R' is a hydrogen, alkyl or alkenyl group; and R" is a hydrogen or alkyl group.

Another method of synthesizing these nonionic organoaluminum compounds is described in copending application Serial No. 822,046, filed May 5, 1969, now U.S. 3,634,482. This latter method comprises causing interaction among aluminum, a conjugated diene, an alkali metal aluminum tetrahydrocarbyl and hydrogen, the reaction being conducted in the presence of a Lewis base capable of complexing with the nonionic organoaluminum compound without undergoing excessive cleavage.

THE INVENTION

This invention relates to still another efficient method for the synthesis of the foregoing nonionic organoaluminum compounds. In particular, this invention relates to the discovery that nonionic organoaluminum compounds possessing an aluminacyclopentene moiety can be formed by mixing (a) alkali metal 1,1 - dihydrocarbylaluminacyclopent-3-enide with (b) aluminum trihydrocarbyl or dihydrocarbyl aluminum hydride in proportions corresponding to at least about 1.3 moles of (b) per mole of (a) in the presence of a Lewis base capable of complexing with the nonionic organoaluminum compound so formed. In performing this operation reagents (a) and (b) may be concurrently fed into a suitable reaction vessel or either one of the reagents may be fed into the other. On bringing the reagents together in the requisite proportions an equilibrium is established as follows:

(1) Reaction employing trihydrocarbyl aluminum

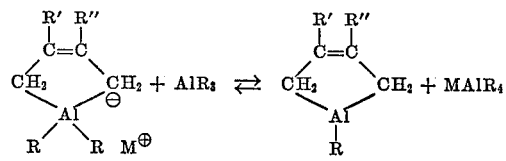

(2) Reaction employing dihydrocarbyl aluminum hydride

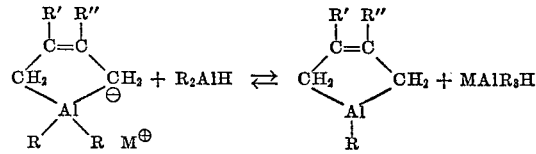

In the above equations, R is a hydrocarbon group having up to about 18 carbon atoms, preferably a lower alkyl group; R' is preferably a hydrogen, alkyl or alkenyl group; R" is preferably a hydrogen or alkyl group; and M is alkali metal (Li, Na, K, Rb, Cs).

For best results the above operations are conducted in or in the presence of such Lewis bases as tertiary amines, dialkyl ethers, cycloparaffinic monoethers having a five or six membered ring, cycloparaffinic diethers having a five or six membered ring, or the like. The use of ethers as the Lewis base for the process is preferred, some exemplary materials being diethyl ether, dibutyl ether, tetrahydrofuran, 1,3-dioxolane, tetrahydropyran, and 1,4-dioxane.

Methods for the synthesis of the alkali metal 1,1-dihydrocarbylaluminacyclopent-3-enide reactant are known and available to those skilled in the art. See, for example, the Lehmkuhl paper referred to above, the disclosure of which is incorporated herein. Exemplary of such reactants are the following: lithium, sodium, potassium, rubidium and cesium 1,1-dimethylaluminacyclopent-3-enide; Li, Na, K, Rb, and Cs 1,1-diethylaluminacyclopent-3-enide; Li, Na, K, Rb, and Cs 1,1-dibutylaluminacyclopent-3-enide; Li, Na, K, Rb, and Cs 1,1-dioctylaluminacyclopent-3-enide; Li, Na, K, Rb, and Cs 1,1-dicyclohexylaluminacyclopent-3-enide; Li, Na, K, Rb, and Cs 1,1-dicyclohexenylaluminacyclopent-3-enide; Li, Na, K, Rb, and Cs 1,1-dibenzylaluminacyclopent-3-enide; Li, Na, K, Rb, and Cs 1,1-diphenylaluminacyclopent-3-enide; Li, Na, K, Rb, and Cs 1,1-di-p-tolylaluminacyclopent-3-enide; Li, Na, K, Rb, and Cs 1,1-dipropyl-3-methylaluminacyclopent-3-enide; Li, Na, K, Rb, and Cs 1,1-dimethyl-3-ethylaluminacyclopent-3-enide; Li, Na, K, Rb, and Cs 1,1-dibutyl-3,4-dimethylaluminacyclopent-3-enide; Li, Na, K, Rb, and Cs 1,1-dimethyl-3-phenylaluminacyclopent-3-enide; Li, Na, K, Rb, and Cs 1,1-dimethyl-3-(4-methylpent-3-enyl)aluminacyclopent-3-enide; and the like. Other exemplary compounds of this type will now be apparent to those skilled in the art.

From the cost standpoint the use of lithium, sodium or potassium 1,1-dihydrocarbylaluminacyclopent-3-enides as a reactant is preferred, the sodium reagents being particularly desirable in this respect. In the usual situation the two monovalent hydrocarbyl groups attached to the aluminum atom of the alkali metal 1,1-dihydrocarbylaluminacyclopent-3-enide reactant (R in Equationn 1 and 2 above) will correspond to the organic groups present in the trihydrocarbyl aluminum compound used in synthesizing this alkali metal reactant. Since trialkylaluminum compounds are readily available at reasonable cost, these two substituent groups will often be alkyl groups each containing up to about 18 and preferably up to about 8 carbon atoms. Other hydrocarbyl derivatives are suitable, however.

The other primary reactant in the process of this invention is a hydrocarbyl aluminum compound which may be represented by the formula $$R_nAlH_m$$

wherein R is a hydrocarbyl group having up to about 18 carbon atoms (alkyl, alkenyl, alkynyl, cycloalkyl, cycloalkenyl, aryl, aralkyl, alkaryl, etc.), $n$ is 2–3 inclusive, and $m$ is 0–1 inclusive, the sum of $n$ and $m$ being 3. Thus, this reactant may be an aluminum trihydrocarbyl or a dihydrocarbyl aluminum hydride.

Exemplary compounds which may be used in the process of this invention include trimethylaluminum, triethylaluminum, tripropylaluminum, tributylaluminum, triisobutylaluminum, trihexylaluminum, trioctylaluminum, tri-2-ethylhexylaluminum, tridecylaluminum, tritetradecylaluminum, trioctadecylaluminum, tris-3-butenyl aluminum, tris-6-heptynyl aluminum, tricyclopentylaluminum, tricyclohexylaluminum, tricyclohexenylaluminum, triphenylaluminum, tri-p-tolylaluminum, tribenzylaluminum, tris-2-phenethyl aluminum, dimethylaluminum hydride, diethylaluminum hydride, dipropylaluminum hydride, diisobutylaluminum hydride, diheptylaluminum hydride, dipentadecylaluminum hydride, bis-9-decynyl aluminum hydride, dicyclopentylaluminum hydride, dicyclopentenylaluminum hydride, dibenzylaluminum hydride, and any of a host of related compounds. Mixtures of aluminum trihydrocarbyls and dihydrocarbyl aluminum hydrides may be employed and of these it is preferred that the hydrocarbyl groups be uniform within the mixture (e.g., a mixture of triethylaluminum and diethylaluminum hydride in any proportions, etc.). On the basis of availability, cost and over-all suitability for the reaction the dialkylaluminum hydrides are preferred and the aluminum trialkyls are particularly preferred. The lower alkyl trialkyl aluminums are particularly efficacious.

The hydrocarbyl groups of the hydrocarbyl aluminum reagent need not correspond to the hydrocarbyl groups of the alkali metal 1,1-dihydrocarbylaluminacyclopent-3-enide.

To establish the desired equilibrium in the reaction system at least about 1.3 moles of the hydrocarbyl aluminum reagent should be employed per mole of the alkali metal 1,1-dihydrocarbylaluminacyclopent-3-enide. For best results, it is generally desirable to employ these reagents in a mole ratio of at least about 2.5 to 1, respectively. The upper limit on the proportions is discretionary and is governed solely by matters of convenience and economy. Thus, this mole ratio may be extended upwards beyond 10:1 or 20:1 should this be desired.

As noted above, the equilibrium reaction is established in the presence of a Lewis base capable of complexing with the nonionic cyclic organoaluminum compound formed in the system. In most cases this Lewis base will be employed as the principal reaction solvent—i.e., the reaction will be conducted in the Lewis base selected for use. However, if desired, the reaction may be effected in a suitable inert hydrocarbon medium (e.g., paraffinic or aromatic hydrocarbon solvents such as hexane, heptane, octane, decane, cyclohexane, benzene, toluene, xylenes, and the like) provided a proper amount of the Lewis base is also present in the reaction system. Ordinarily the system should contain at least 1–2 moles of Lewis base per mole of alkali metal 1,1-dihydrocarbylaluminumcyclopent-3-enide employed. Particularly convenient Lewis bases for use in the process are tertiary amines (e.g., trimethyl amine, dimethylethyl amine, triethyl amine, tributyl amine, triphenyl amine, tribenzyl amine, benzyldimethyl amine, N-methyl morpholine, N,N-diethyl aniline, N,N,N',N'-tetramethyl methylene diamine, N,N,N',N'-tetramethyl ethylene diamine, pyridine, N-methyl pyrrolidine, triethylene diamine, quinuclindine, and the like); dialkyl ethers (e.g., dimethyl ether, diethyl ether, diisopropyl ether, methylisoamyl ether, dibutyl ether, dihexyl ether and the like); cycloparaffinic monoethers having a six membered ring (e.g., tetrahydropyran—pentamethylene oxide—and ring alkylated derivatives thereof); and cycloparaffinic diethers having a five or six membered ring (e.g., 1,4-dioxane, 1,3-dioxane, 2-methyl-2-ethyl-1,3-dioxolane, and the like); and other similar substances such as dicyclohexyl ether, dibenzyl ether and the like.

In conducting the process of this invention there is ordinarily no particular reason for effecting the mixing operation at temperatures other than at ordinary room temperatures (e.g., 15–25° C.). If desired, however, the mixing may be performed at temperatures ranging from about −20° C. up to about 100° C., temperatures falling within this range being generally preferable and temperatures in the range of about −20° C. to about 50° C. being quite convenient. Temperatures higher than 100° C. are entirely feasible so long as one takes into consideration not only the boiling points of the ingredients present in the system and their thermal stabilities, but the ability of the nonionic cyclic organoaluminum product to cleave certain Lewis bases such as tetrahydrofuran and alkyl tetrahydrofurans at elevated temperatures (e.g., 140–150° C.). Thus, the temperature should not be elevated to such an extent as to cause excessive cleavage of the particular Lewis base in the system unless of course the reaction is being utilized for the purpose of effecting the cleavage/condensation reaction disclosed, for example, in copending application Ser. No. 771,651, filed Oct. 29, 1968, now U.S. 3,631,065.

It will of course be understood that the reaction mixture should be kept essentially anhydrous and that exposure of the reaction system to air should be kept to a minimum.

In order to still further appreciate the practice of this invention the following illustrative examples are presented.

Example I

A solution of sodium 1,1-dimethylaluminacyclopent-3-enide in tetrahydrofuran was prepared by the procedure of Lehmkuhl (loc. cit.). With a portion of this solution containing 15.7 millimoles of sodium 1,1-dimethylaluminacyclopent-3-enide was blended trimethylaluminum (21.0 millimoles) so that the mole ratio of trimethylaluminum:sodium reagent was about 1.3:1. The presence of 1-methylaluminacyclopent-3-ene in the system was verified by sealing the equilibrium mixture in an autoclave and raising the temperature to 150° C. for three hours in order to cause the 1-methylaluminacyclopent-3-ene to cleave and react with the tetrahydrofuran. The resultant reaction mixture was then subjected to acid hydrolysis (aqueous HCl) and extracted with diethyl ether. The presence in the extract of 3.1 millimoles of 3-methyl-1-hepten-7-ol (the cleavage/hydrolysis product) was established by quantitative vpc methods. This alkenol was produced in a yield of 19.7 percent.

It is interesting to note that when 16.7 millimoles of sodium 1,1-dimethylaluminacyclopent-3-enide in tetrahydrofuran was heated at 150° C. for three hours in an autoclave in the absence of trimethylaluminum, the ether extract of the hydrolysis product contained essentially no alkenol. Thus sodium 1,1-dimethylaluminacyclopent-3-enide does not itself participate in this cleavage reaction to any appreciable extent.

Example II

The procedure of Example I was repeated using 34.1 millimoles of trimethylaluminum and 11.8 millimoles of sodium 1,1-dimethylaluminacyclopent-3-enide in tetrahydrofuran. In this reaction wherein the reagents were employed in a mole ratio of 2.9:1, the final ether extract contained 6.8 millimoles of 3-methyl-1-hepten-7-ol, the yield being 57.6 percent.

Various uses for the nonionic organoaluminum compounds produced in the process of this invention are set forth in copending applications Ser. No. 771,651, filed Oct. 29, 1968, now U.S. 3,631,065; Ser. No. 821,954, filed May 5, 1969, now U.S. 3,641,084; Ser. No. 822,046, filed May 5, 1969, now U.S. 3,634,482; and Ser. No. 889,741, filed Dec. 31, 1969, now U.S. 3,642,825, the disclosure of all such applications being incorporated herein by the foregoing reference.

The nonionic cyclic organoaluminum compounds formed in the process of this invention have a marked tendency to form complexes with Lewis bases and thus usually the product will involve complexation between the nonionic cyclic organoaluminum compound and the Lewis base in whose presence the equilibrium reaction was established. While it is possible to separate the resultant Lewis base complex from the coproducts in the system, this is usually unnecessary as the cyclic aluminum compound may be used in synthesis reactions which are unaffected by the presence of the coproducts. The alkenol synthesis set forth in the above examples serves as an illustration of such a situation.

I claim:

1. A process of forming a nonionic organoaluminum compound possessing an aluminacyclopentene moiety which comprises mixing (a) alkali metal 1,1-dihydrocarbylaluminacyclopent-3-enide with (b) aluminum trihydrocarbyl or dihydrocarbyl aluminum hydride in proportions corresponding to at least about 1.3 moles of (b) per mole of (a) in the presence of a Lewis base capable of complexing with the nonionic organoaluminum compound so formed.

2. The process of claim 1 wherein an aluminum trialkyl is employed as reagent (b).

3. The process of claim 1 performed in a liquid reaction medium containing an ether as the Lewis base.

4. The process of claim 1 performed at a temperature in the range of from about −20 to about 100° C.

5. The process of claim 1 wherein said proportions correspond to at least about 2.5 moles of (b) per mole of (a).

6. The process of claim 1 wherein reagent (a) is a lithium, sodium or potassium 1,1-dialkylaluminacyclopent-3-enide, reagent (b) is trialkylaluminum or dialkylaluminum hydride, said proportions correspond to at least about 2.5 moles of (b) per mole of (a) and the mixing is performed at a temperature in the range of from about −20 to about 50° C.

7. The process of claim 1 performed in an ether reaction medium at a temperature in the range of from about −20 to about 50° C.

8. The process of claim 7 wherein said ether is a dialkyl ether or a cycloparaffinic mono- or diether having a five or six membered ring.

9. The process of claim 1 wherein the alkali metal of reagent (a) is sodium.

10. The process of claim 1 wherein sodium 1,1-dihydrocarbylaluminacyclo-pent-3-enide is mixed with trialkylaluminum at a temperature in the range of from about −20 to about 50° C. and wherein said Lewis base is an ether.

11. The process of claim 1 wherein the Lewis base is employed as the principal reaction solvent.

12. The process of claim 1 wherein reagent (a) is an alkali metal 1,1-dialkylaluminacyclopent-3-enide.

13. The process of claim 1 wherein reagent (a) is sodium 1,1 - dimethylaluminacyclopent-3-enide, reagent (b) is trimethylaluminum, and said proportions correspond to at least about 2.5 moles of (b) per mole of (a).

14. The process of claim 1 performed at about room temperature.

References Cited

UNITED STATES PATENTS

| | | | |
|---|---|---|---|
| 3,470,224 | 9/1969 | Lehmkuhy | 260—448 A |
| 3,493,623 | 2/1970 | Brendel | 260—448 A |
| 3,629,346 | 12/1971 | Skinner | 260—448 A |
| 3,631,065 | 12/1971 | Brendel et al. | 260—448 A |
| 3,634,482 | 1/1972 | Shepherd | 260—448 A |
| 3,641,084 | 2/1972 | Shepherd | 260—448 A |
| 3,669,990 | 6/1972 | Shepherd | 260—448 A |
| 3,670,001 | 6/1972 | Shepherd | 260—448 A |

HELEN M. S. SNEED, Primary Examiner

PO-1050
(5/69)

UNITED STATES PATENT OFFICE
CERTIFICATE OF CORRECTION

Patent No. 3,755,400            Dated August 28, 1973

Inventor(s) Lawrence H. Shepherd, Jr.

It is certified that error appears in the above-identified patent and that said Letters Patent are hereby corrected as shown below:

Column 2, line 26 (in the formula), the first compound is incorrect and should read --

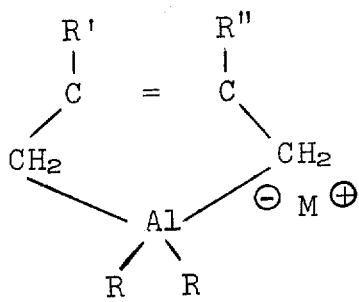

Column 2, line 35 (in the formula), the first compound is incorrect and should read --

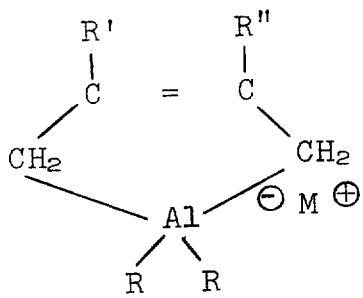

Column 6, line 45, "Lehmkuhy" should read -- Lehmkuhl --.

Signed and sealed this 18th day of December 1973.

(SEAL)
Attest:

EDWARD M. FLETCHER, JR.
Attesting Officer

RENE D. TEGTMEYER
Acting Commissioner of Patents